May 19, 1953 — H. M. PUTMAN, JR — 2,638,741
AXIAL FLOW GAS TURBINE HAVING REHEATING MEANS AND
SPECIALLY SHAPED ROTOR AND STATOR BLADES
TO PROVIDE ISOTHERMAL EXPANSION
Filed Aug. 11, 1948 — 7 Sheets-Sheet 1

Inventor,
Henry M. Putman Jr.
by Roberts Cushman & Grover
Attys.

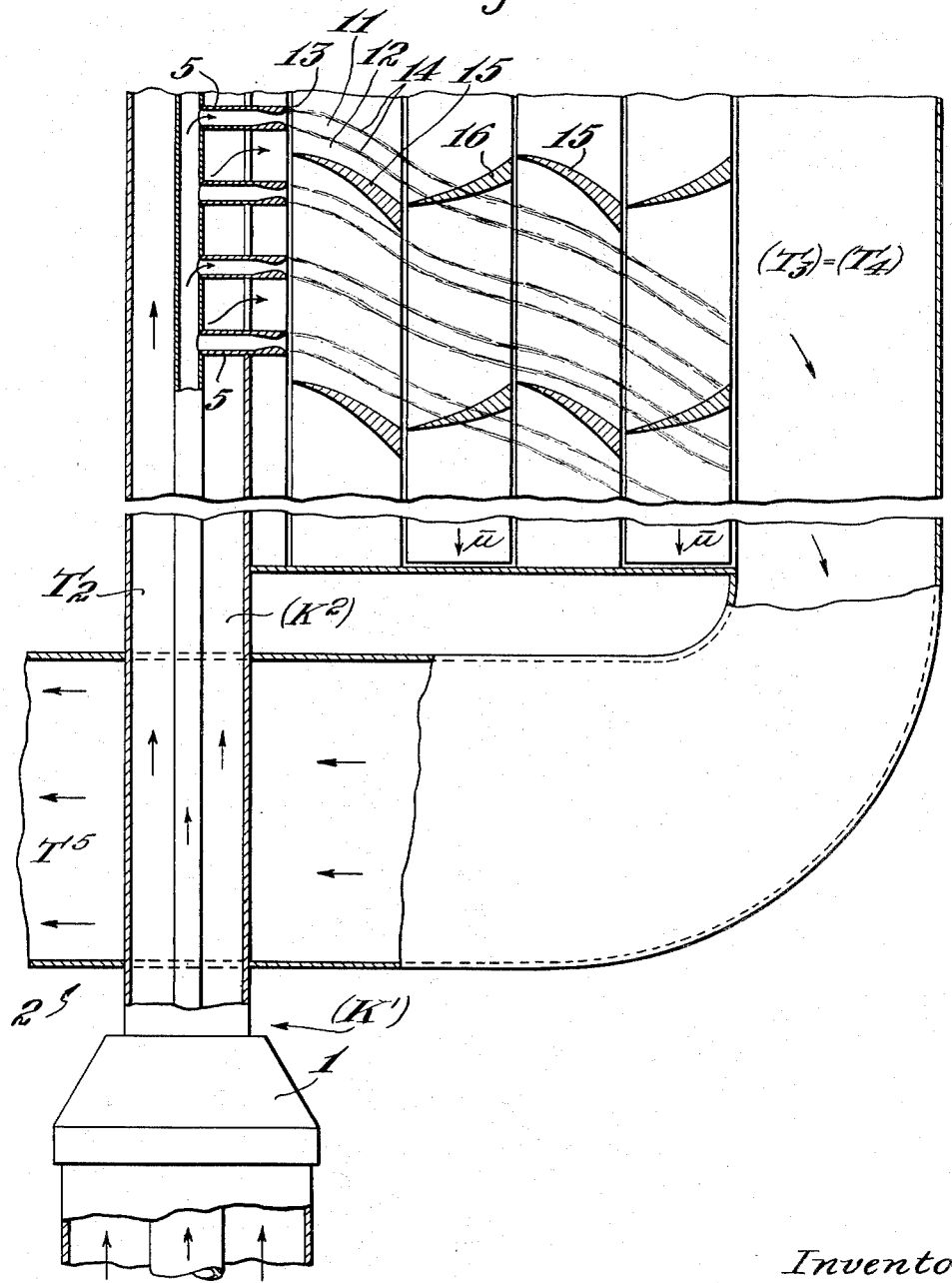

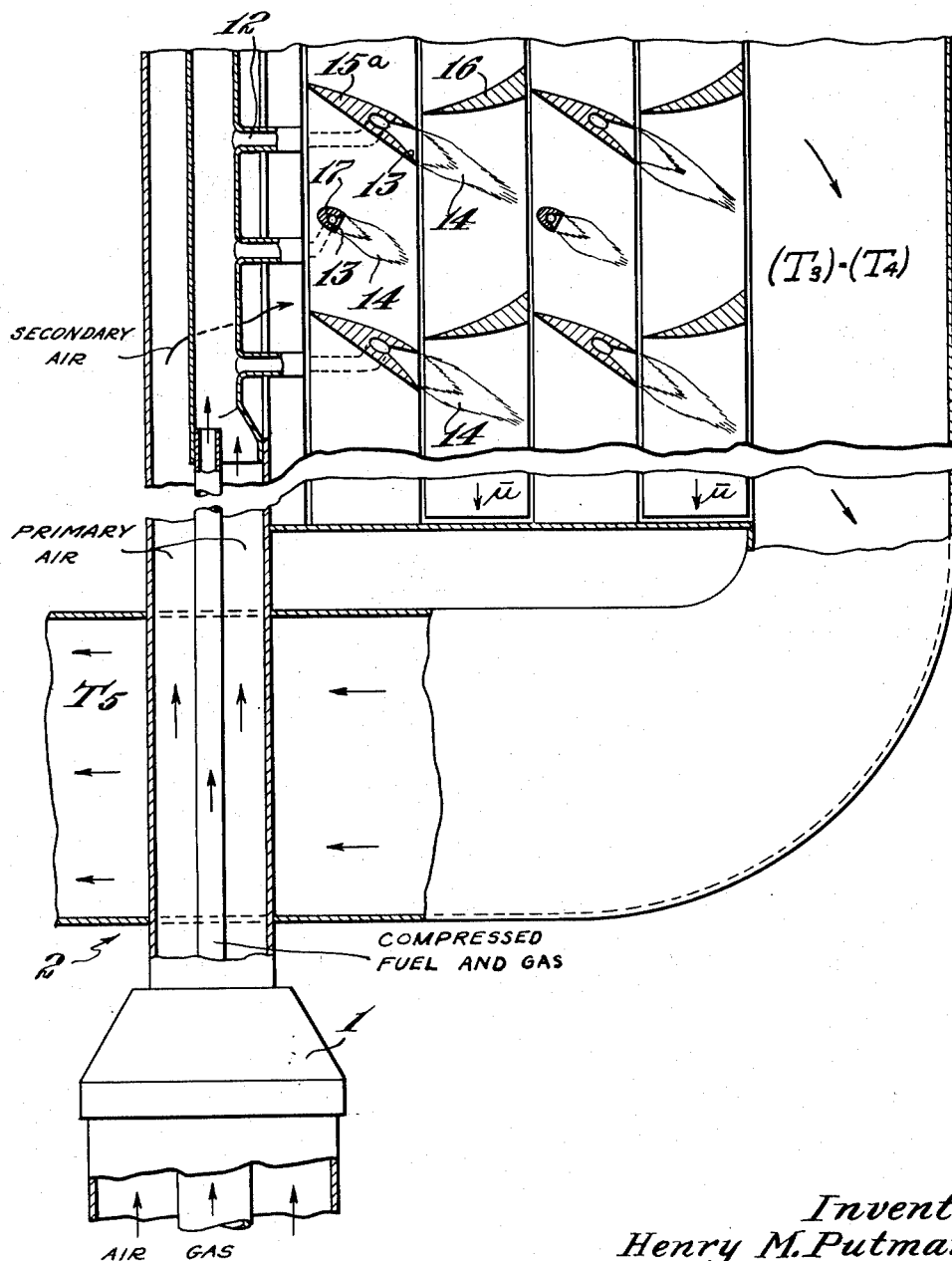

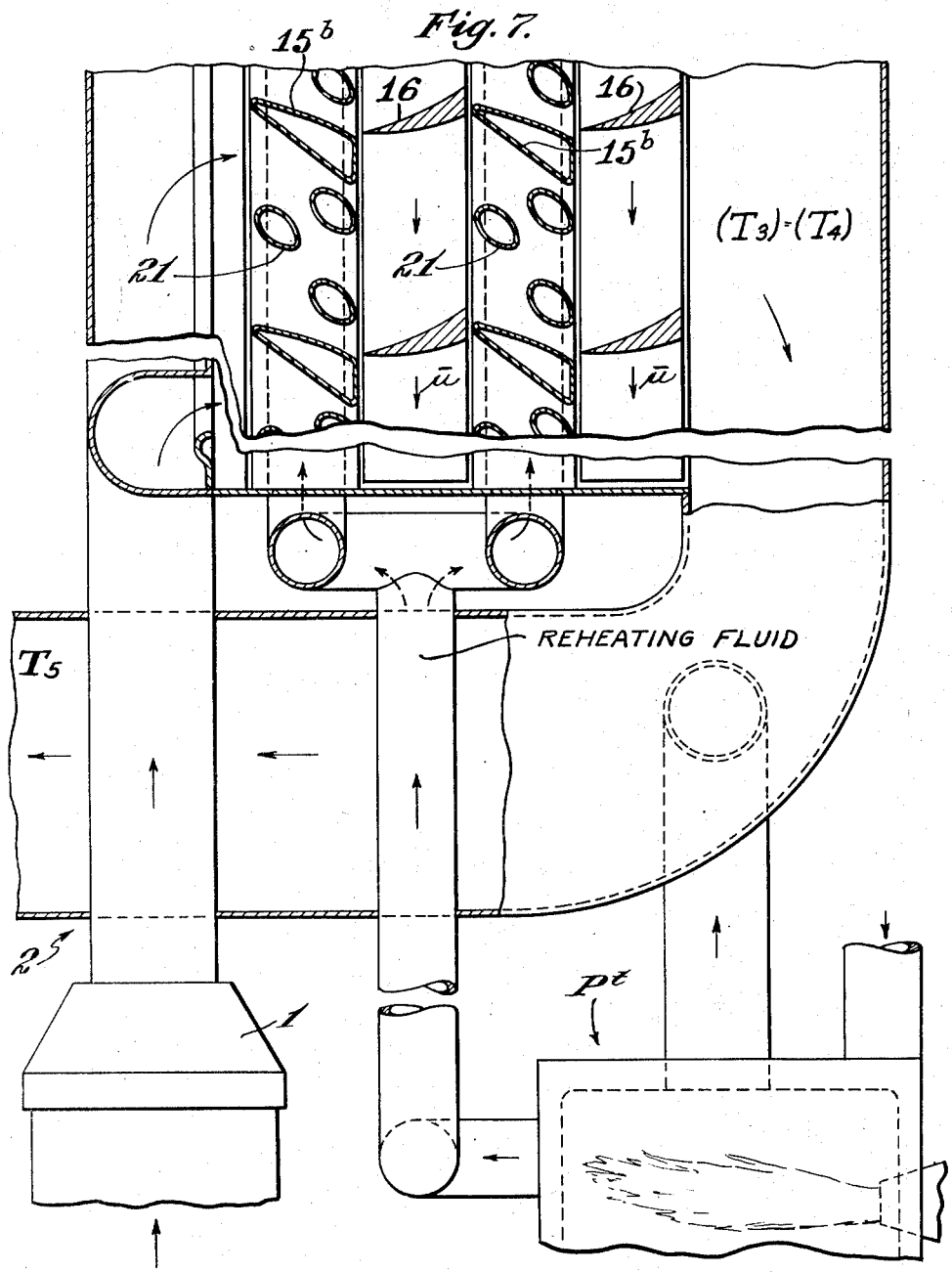

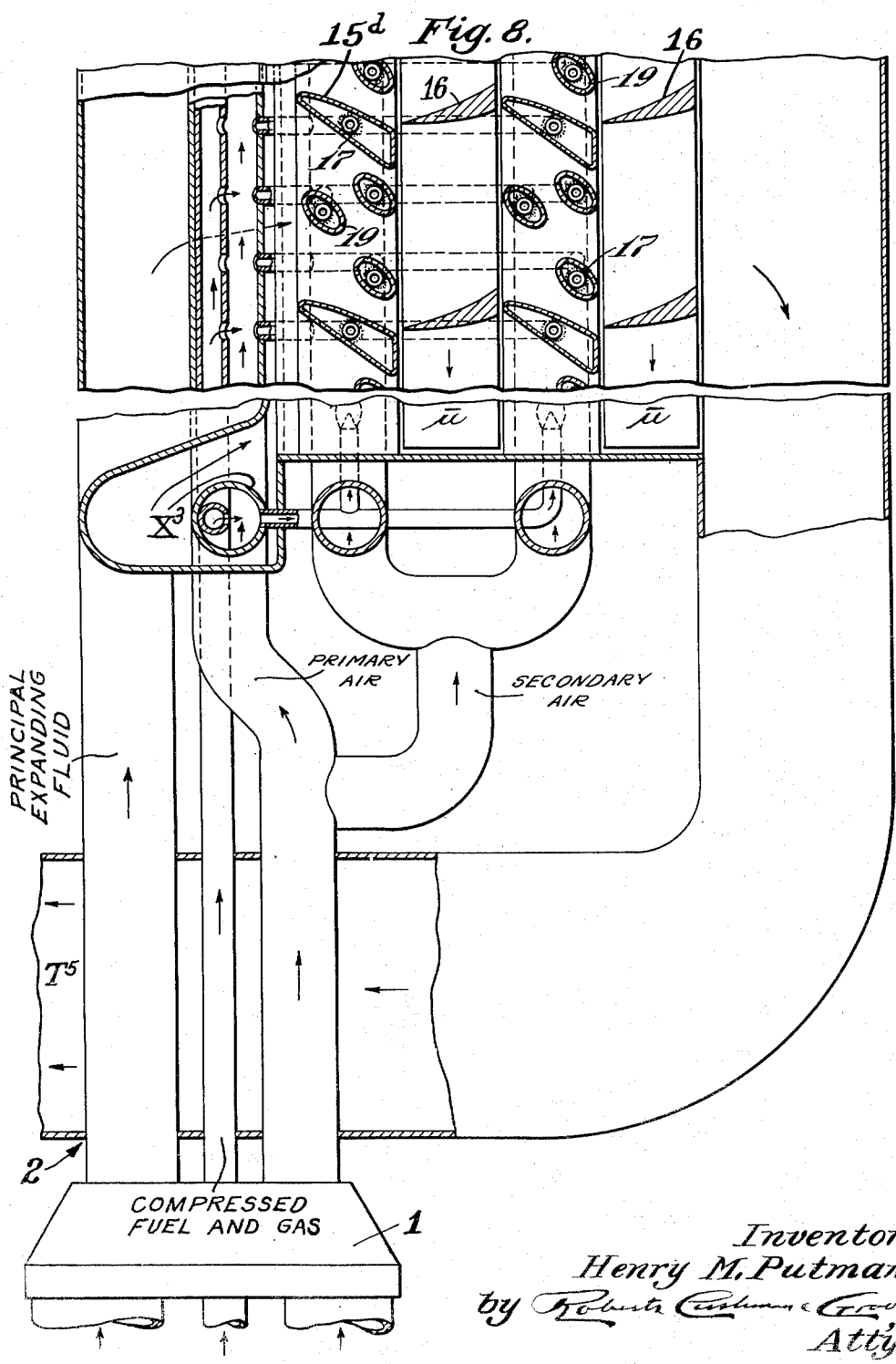

May 19, 1953     H. M. PUTMAN, JR     2,638,741
AXIAL FLOW GAS TURBINE HAVING REHEATING MEANS AND
SPECIALLY SHAPED ROTOR AND STATOR BLADES
TO PROVIDE ISOTHERMAL EXPANSION
Filed Aug. 11, 1948     7 Sheets-Sheet 6
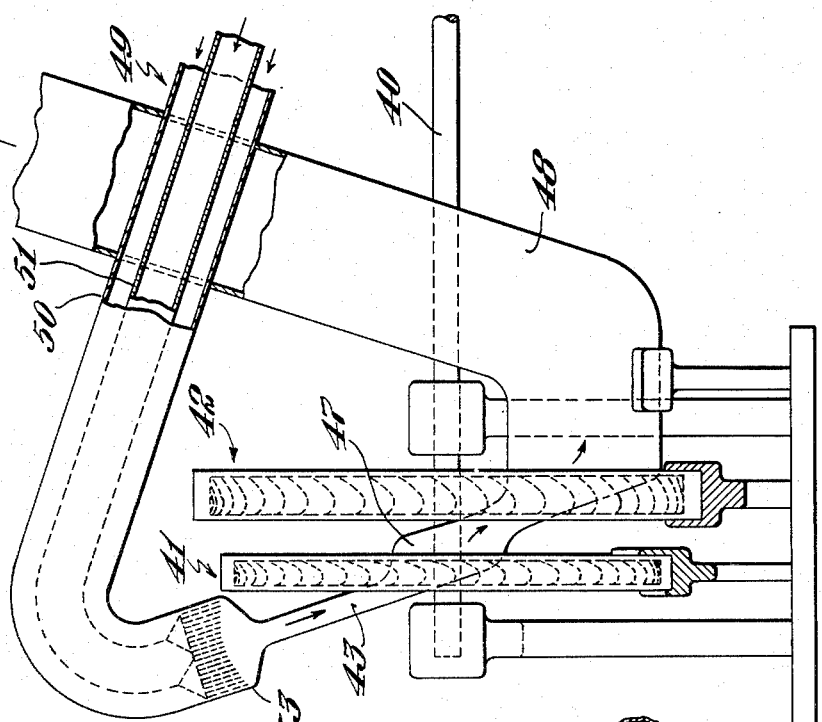
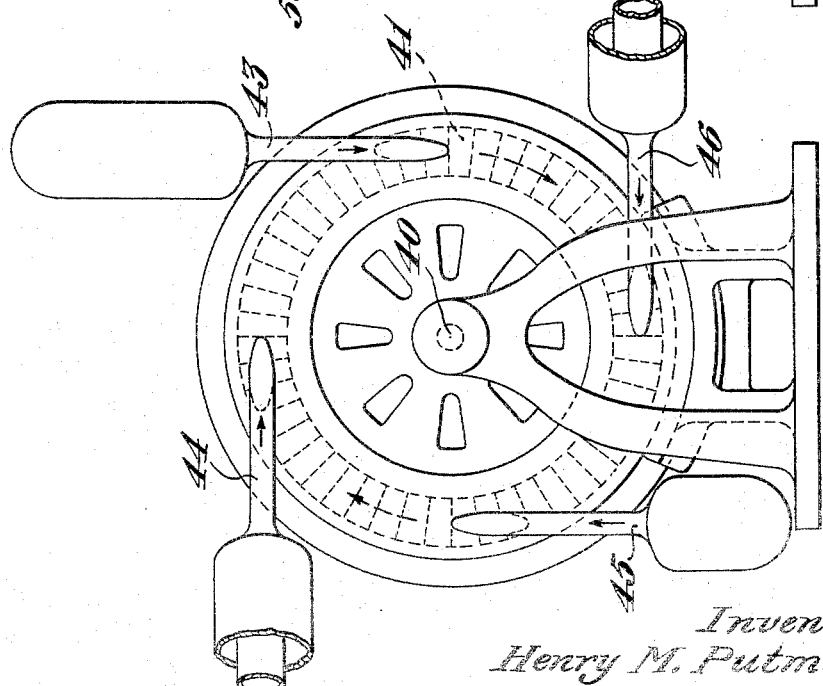
Inventor,
Henry M. Putman Jr.
by Roberts Cushman Groves
Attys.

Patented May 19, 1953

2,638,741

UNITED STATES PATENT OFFICE 2,638,741

AXIAL FLOW GAS TURBINE HAVING REHEATING MEANS AND SPECIALLY SHAPED ROTOR AND STATOR BLADES TO PROVIDE ISOTHERMAL EXPANSION

Henry M. Putman, Jr., Champaign-Urbana, Ill.

Application August 11, 1948, Serial No. 43,593

11 Claims. (Cl. 60—39.17)

This invention relates to apparatus for use in the generation of power. More particularly it concerns gas turbine power plants. A principal object of the present invention is to provide a practical power plant operating at the high efficiency of the Carnot cycle. A further object is to provide a turbine power plant of high efficiency and low weight. More specifically it is an object of the invention to provide a gas turbine so designed that the expanding working fluid remains at a constant temperature during its passage through the turbine blading—in other words, to provide a turbine which operates isothermally. I am aware that it has heretofore been proposed to cause isothermal expansion in certain parts at least of gas turbine installations, but no practical way of realizing isothermal expansion within the blades of the turbine itself has heretofore been devised. The present invention contemplates the proportioning of the passages between the blades of the turbine in accordance with the heat actually released within said passages. In other words, the invention contemplates a design of these passages so that they have that particular and definite shape which insures isothermal expansion of the fluid as it flows through said passages. The only practical way of expressing the constantly varying shape and dimensions of said passages is by the use of a mathematical formula. Although the invention is apparently most important in its application to gas turbines, the general principle involved is useful in turbines operating with steam, mercury vapor or other gaseous fluid.

One object of the invention is to provide novel apparatus wherein a gaseous medium is expanded isothermally and in doing so creates mechanical energy. A further object is to provide a gas turbine which operates substantially on a pseudo-Carnot cycle. A further object is to provide a prime mover comprising a stator and a rotor designed to convert the energy of an expanding gaseous medium into mechanical work and having provision for maintaining the temperature of the gaseous medium substantially constant during its expansion. A further object is to provide a turbine having working passages for the flow of an expanding gaseous medium, the passages being so shaped as to insure isothermal expansion of the gaseous medium as it flows through the passages.

In the usual commercial gas turbine air is first compressed, then its temperature is increased by burning fuel intermingled with the air in a combustion chamber and then the hot products of combustion are expanded almost adiabatically through the turbine stages. In some cases reheating between stages has been proposed, for example in the Swiss Patent No. 88,624.

In accordance with the present invention the separate combustion chamber is preferably omitted and combustion takes place under isothermal conditions within the turbine blading itself. The gases enter the turbine uncombined and at a high temperature and pressure. They expand as they are burned and they come out of the turbine at a relatively low pressure. The expansion which takes place in the turbine blades is at a substantially constant temperature. The heat of the expanded gases coming out of the turbine is used to preheat the entering gaseous mixture to a temperature which approximates that of combustion.

The novel process of the present invention consists essentially in causing one or more fluids to evolve in a continuous manner with constant input of heat while flowing through a passage whose transverse section so varies from point to point, with respect to the heat input at successive points, as to cause an isothermal expansion.

There is herein disclosed the way of establishing the shapes and dimensions of these passages so that isothermal flow is assured, particularly for the general case where the quantity of heat communicated to the flowing fluid in some function of the abscissa along the axis of the passage. This method enables one to establish the varying sections to be given to the passages, either to obtain combined combustion-expansion or a simple expansion, in either case isothermal.

Other and further objects and advantages of the invention will be pointed out in the following more detailed description and with reference to specific examples and to the accompanying drawings wherein Fig. 1 is a diagram illustrative of a duct for the continuous flow of gaseous fluid and which is employed herein as a basis for certain definitions of terms employed;

Fig. 5 is a fragmentary diagrammatic vertical section, partly in elevation, illustrating an internal combustion turbine power plant in accordance with one embodiment of the invention;

Fig. 6 is a view generally similar to Fig. 5 but illustrating a turbine wherein numerous small burners are arranged within the blading in such a way that the burning gases are separated from expanding gases, the blades themselves being hollow so as to house burners, or, alternatively, to convey hot burned bases from a centrally located combustion chamber or furnace;

Fig. 7 is a view generally similar to Fig. 5 but illustrating a turbine wherein heat is added to the flowing gaseous fluid during expansion by the use of a secondary circulating superheated fluid, for example mercury vapor;

Fig. 8 is a view generally similar to Fig. 5 but illustrating a turbine wherein heat is added to the flowing gaseous fluid during expansion by the use of a secondary circulating superheated fluid heated by burners and flowing through the stationary blades;

Fig. 9 is a diagrammatic end elevation of a turbine embodying the present invention;

Fig. 10 is a fragmentary diagrammatic side elevation of the turbine of Fig. 9;

In the following discussion it will be shown that it is technically possible so to shape the flow passages of a gas turbine with respect to the heat supplied as to insure a constant temperature of the flowing fluid. It will also be shown how to arrive at the proper shapes of the fluid passages. Since these shapes are best defined in terms of mathematical equations, resort will be had to this method of disclosing the invention.

Figure 1:
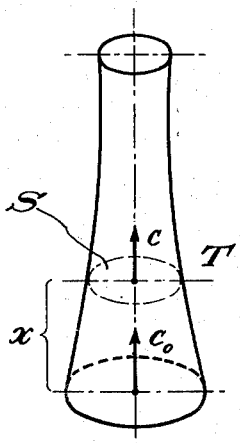
Figure 13:
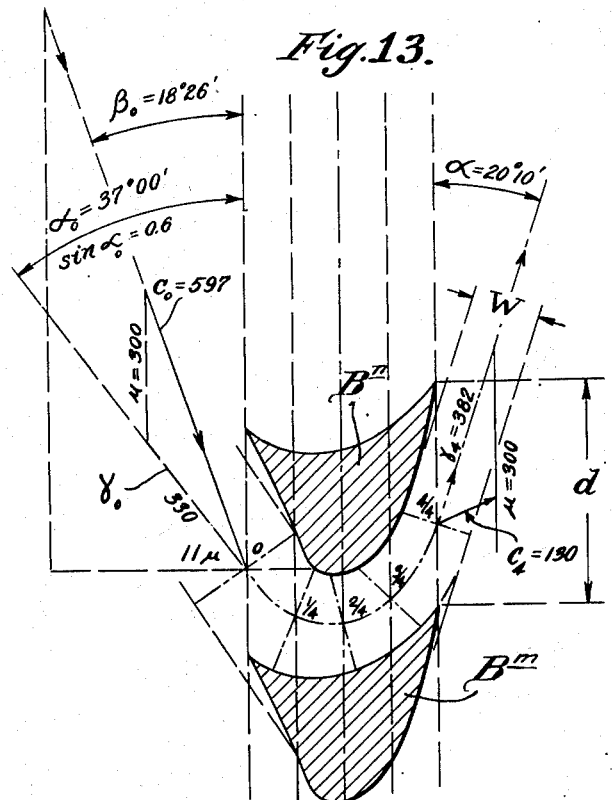
Fig. 13 is a diagrammatic section, for example on the plane of line 13—13 of Fig. 12, illustrating the shapes of a pair of adjacent turbine blades made in accordance with the present invention.

In the following discussion, reference is made to Figs. 1, 2 and 13 and the following definitions are employed:

$x$ is the abscissa of the running section taken along the axis of the duct.

$C$ is the mean velocity of the gas at the running section; for purpose of simplification the gas is supposed homogeneous and this velocity is supposed uniform in this section. ($C$ is a function of $x$.)

$C_0$ is the mean velocity at the entrance of the duct.

$P$ is the discharge from the duct, that is to say, the quantity of fluid passing through the duct per unit of time, a known constant quantity.

$\zeta x$ is the quantity of energy transformed into heat by friction loss. (A sufficient approximation considers $\zeta$ constant.)

$v$ is the specific volume of the gas in the running section. ($v$ is a function of $x$.)

$p$ is the pressure of the gas in the running section. ($P$ is a function of $x$.)

$T$ is the absolute temperature of the gas in the running section. The gas is supposed to be a perfect gas. ($T$ is also a function of $x$.)

$R$ is the gas constant.

$S$ is the area of any chosen section, here referred to as the "running" section. ($S$ is a function of $x$.)

$S_0$ is the area of the entrance to the duct.

$g$ is the acceleration due to gravity.

$p_0$ is the pressure at the entrance to the duct.

$R^a$ is the outer radius of the duct.

$R_0$ is the radius of the entrance to the duct.

$A$ is the caloric equivalent of work.

$\mu$ is the linear velocity of the rotor.

$\gamma$ is the relative velocity of the rotor and the entering fluid.

$P$ is the quantity of fluid flowing through the duct per unit of time.

A relation may be derived between the above quantities which enables one to find experimentally the proper area to give to any chosen section and thus to determine the form to be given to the duct in order that the flow be isothermal. The equations of flow are:

$$\zeta x + \frac{C^2}{2g} - \frac{C_0^2}{2g} = -\int_0^x v\,dp \quad [1]$$

$$\frac{CS}{v} = P \quad [2]$$

$$pv = RT \quad [3]$$

By derivation with respect to $x$ and by elimination, $$\left(RT - \frac{C^2}{g}\right)C' + \left(RT\frac{S'}{S} - RT' - \zeta\right)C = 0 \quad [4]$$

This is a differential equation of the first order with respect to $C$ which enables one to find the velocity $C$ in terms of a function of the abscissa $x$. $C$ being known, one is able to find $v$ in terms of a function of $x$ from [2] and $p$ in terms of $x$ from [3].

If the cumulative quantity of heat communicated to the flowing gas (from the initial section at the entrance of the duct up to the running section at abscissa $x$) is named $q(x)$, a function of $x$, this quantity is related to the above values by the equation:

$$q(x) + A\zeta x = \int_0^x T\,dZ$$

Where $A$ is the caloric equivalent of work and where $Z$ is the entropy which can be evaluated from the entropic diagram, or computed from the following formula valid for perfect gases:

$$Z = C_v \log_n p + C_p \log_n v$$

Equation 4 above shows that in the general case of steady flow all the physical variables of the flow may be computed if one knows for each section the temperature (supposed to be uniform in the section) and the area of the section.

This method makes possible the experimental study of all flows where the heat communicated to the flowing fluid is a function of the abscissa along the axis of the flow. Such flow may be a jet, diffusion flame, continuous combustion, or continuous reheating. By this method one is able to find the appropriate sections and areas for a duct in order that for a given communicated heat the flow may be isothermal and also to measure the communicated heat from a given jet, diffusion flame, or continuous combustion in a given duct; it is sufficient to measure the temperature in each section and to know the area of each section.

The conditions for isothermal flow are:

$$\frac{C^2}{2g} - \frac{C_0^2}{2g} = \frac{q}{A} \quad [5]$$

with $$S = \frac{PRT}{Cp} \quad [2^a]$$

and $$\frac{C^2}{2g} - \frac{C_0^2}{2g} = RT \log \frac{P_0}{p} - \zeta x \quad [5^a]$$

from which can be derived $$q = ART \log \frac{p_0}{p} - A\zeta x$$

or $$\frac{p_0}{p} = e^{\frac{q + A\zeta x}{ART}}$$

$$\frac{S}{S_0} = e^{\frac{q + A\zeta x}{ART}} \frac{C_0}{\sqrt{C_0^2 + \frac{2g}{A}q}} \quad [6]$$

This last Equation 6 enables one directly to find the running Area$=S$ ($x$) of the duct in terms of a function of the communicated heat $q=q$ ($x$) so as to insure isothermal flow. This equation also holds for a moving duct, providing the movement of the duct is pure translation, that is to say, all points in the duct have the same velocity relatively to a fixed axis.

However, with reference to a moving duct, the value $c$ in the formula must be recognized as a relative velocity, that is to say, the velocity of the fluid relatively to the moving duct. Moving turbine ducts, blades or buckets may be treated thus, providing the stream of fluid is thin and sufficiently short, relatively to the distance between said part and the axis of rotation of said part.

Figure 2:
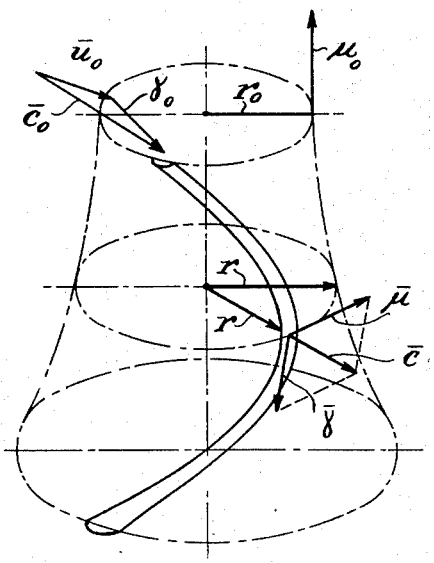
Fig. 2 is a view similar to Fig. 1 but modified for use in the discussion of flow conditions when the duct is bodily moving, for instance, when the duct is defined by the moving blades of a turbine.

In the general case of a turbine where the above conditions are not realized, the following equations may be used in finding the proper cross-section of the duct to insure isothermal flow, reference being had to Fig. 2 of the drawings:

$$q + A\zeta x = A \int_0^x V dp = A\left(\frac{C^2}{2g} - \frac{C_0^2}{2g} + \zeta x\right) + AW_w$$

where $W_w$ is the work delivered to the wheel between the entrance section (0) and the running section ($x$)

$$S = \frac{Pv}{\gamma} = \frac{PRT}{\gamma p}$$

$$\overline{\gamma} + \overline{\mu} = \overline{C}$$

$$\frac{\mu}{\mu_0} = \frac{r}{r_0}$$

where $a$ is the vectorial value of the reltative velocity; $\overline{c}$ is the vectorial value of the absolute velocity; and $\overline{\mu_0}$ is the vectorial value of the linear velocity of the wheel.

By reference to the diagrammatical views of Figs. 5, 6, 7 and 8, four simple ways of attaining the desired results will be described. Two other procedures not specifically illustrated will also be discussed, illustrations being unnecessary with respect to these two latter procedures in view of the illustrations employed in discussing the first four procedures.

One embodiment of the basic principle of the present invention is diagrammatically illustrated in Fig. 5. In the turbine power plant shown in these views, the uncombined gaseous fluids, for example, atmospheric air and a combustible gas, are received at the low temperature $T_0$ and compressed, passing from the initial state (0) the state $K^1$ to where their pressure has increased to a value $p$. The temperature is kept as low as possible during compression but does rise to a value $T_1$. This operation is done in a compressor 1, preferably a rotary compressor. Preferably, though not necessarily, the compressed gases are passed through a heat exchanger 2 where they are heated to a high temperature $T_2$ by the hot exhaust gases from the turbine. The highly heated and compressed gas is then led to a first set of stationary ducts constituting the nozzles 5 where the chemical process of combination or combustion is started. Optionally this combination or combustion may raise the temperature to a higher value $T_3$ before the isothermal process begins.

The gases then expand in flowing through the turbine passages, while at the same time the combustion progresses but the temperature is maintained constant due to the form of the blades and the interblade ducts. Various means may be employed in order to insure continuous combustion inside of the blading.

One method is to employ diffusion flames inside of the blading. The hot compressed gases flow first in parallel streams, as shown at 11 and 12 in Fig. 5. Combustion starts at 13 and continues along the diffusion flame fronts 14 which move through the ducts between the stationary blades 15 and rotating blades 16 of the turbine. The sign $\overline{\mu}$ is a vectorial representation of the velocity of the rotating blades and is intended to distinguish the rotary blades 16 from the stationary blades. Combustion is regulated so that it ends in the last part of the blading and the expanded burned gases flow out of the blading at substantially the same temperature as at their entrance to the blading. The burned gases communicate their heat to the unburned gases in the heat exchanger 2 before leaving the power plant at a temperature $T_5$.

Fig. 5 is intended merely to disclose the characteristics of operaiton and the principle of construction. The structural parts composing turbine and turbine power plant are substantially like those of existing gas turbines. Differences in construction are principally directed to the addition of the necessary pipes and ducts to conduct the fuel to the entrance of the turbine, blading, the addition of a set of burner orifices designed to start chemical combination just before the gaseous fluid enters the blading and passages shaped in accordance with the invention.

Figure 4:
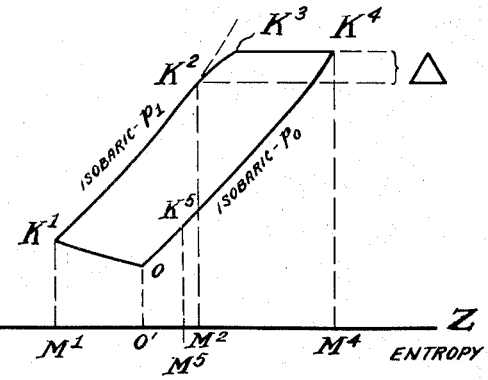
Fig. 4 is the entropy diagram for a turbine embodying the present invention.
Figure 11:
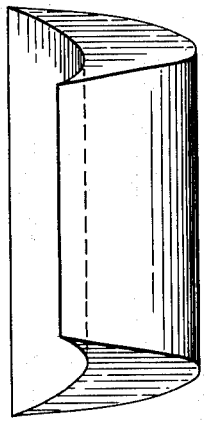
Fig. 11 is an edge elevation of a turbine blade constructed in accordance with the present invention.
Figure 12:
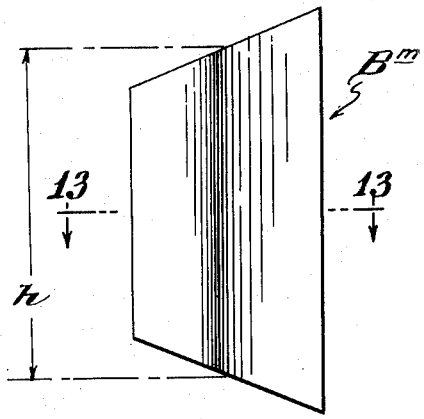
Fig. 12 is a front elevation of the blade of Fig. 11.

In Fig. 4 the entropy Z of the idealized working fluid is plotted against its absolute temperature T. In the diagram the intake is at the point 0, compression takes place between 0 and $K^1$, isobaric heating in a heat exchanger between $K^1$ and $K^2$; combustion starts at $K^2$; isothermic expansion between $K^3$ and $K^4$; isobaric cooling and heat exchange between $K^4$ and $K^5$, and optional exhaust between $K^5$ and 0. The working fluid is taken at atmospheric pressure and temperature $T_0$. This is referred to as the start (0) in Fig. 4. The working fluid undergoes polytropic compression. Its entropy is decreased and its temperature increases slightly to value $T_1$. In the process of compression a quantity of heat, measured by the area $K^1M^1O^1O$, is abstracted from the working fluid. This takes place preferably in a rotary compressor. From state $K^1$ (Fig. 4) the working fluid is heated at constant pressure to the high temperature $T_2$ in the heat exchanger. The quantity of heat supplied to the working fluid during this isobaric exchange is measured by the area $K^1M^1M^2K^2$ (Fig. 4) and is supplied by the exhaust gases. This area is equal to area $K^5M^5M^4K^4$ (Fig. 4) less the heat losses in the heat exchanger.

From state $K^2$ (Fig. 4) at the outlet of the heat exchanger, the working fluid undergoes optionally a superheating process from state $K^2$ to $K^3$ in special ducts just in advance of the turbine blading. This brings its temperature to a value $T_3$. Optionally this superheating may be employed to increase the velocity of the fluid.

From state $K^3$ to $K^4$ (Fig. 4) the fluid undergoes both continuous heating and expansion in the turbine blading. The heat supplied to the fluid from state $K^2$ to state $K^4$ is measured by the area $K^2M^2M^4K^4K^3K^2$ and is all available as mechanical work. This heat can be supplied in various ways. For example, suppose the working fluid is composed of two gases which react chemically with evolution of heat and the combination is gradual as the gases pass through the blading. At the exhaust of the turbine, the working fluid is at substantially the same temperature as at the entrance but at a lower pressure. This is referred to as state $K^4$ and $(T_4=T_3)$. From the exhaust of the turbine the working fluid is led to the heat exchanger and communicates its heat content to the entering fluid. The difference of temperature $\Delta$ (Fig. 4) expressed as $T_4=T_2$ is calculated to permit the necessary quick exchange of heat in the heat exchanger. The quantity of heat exchanged is measured by the area $K^4M^4M^5K^5$ equal to area $K^1M^1M^2K^2$. From state $K^3$ to state $K^4$ the isothermal expansion is represented on the entropic diagram (Fig. 4) by a straight line.

Diffusion flames inside of the blading of the turbine may be employed as previously disclosed. The method of computation to find the proper form to a duct for a diffusion flame so that the flow inside the duct may be an isothermal expansion can be derived from readily available literature.

In a second embodiment of the invention, the blading and the interblade ducts of the turbine are provided with a number of small burners 17 very similar to small Bunsen burners, as diagrammatically illustrated in Fig. 6. In this arrangement the flow of air is divided, the two divisions being referred to as primary and secondary air. The general thermodynamic cycle followed by the secondary air, on the one hand, and the primary air and fuel gas, on the other hand, is in general that illustrated in Fig. 4. However, the temperature of both primary air and fuel gas is kept low enough so that chemical combination is avoided before they reach the burners. The compressed fuel gas and the compressed primary air are mixed and delivered by pipes 12 to a series of small burners 17 in the stationary hollow blading 15$^a$. The number of burners, the heat released by each one, and the relative disposition of the burners are so designed that the working fluid in the turbine blading undergoes isothermal expansion.

Referring to Fig. 7, which illustrates a third specific embodiment, the working fluid is first compressed at 1 and then passes through a heat exchanger 2. The hot compressed fluid is then expanded and at the same time supplied with additional heat by a system of thin walled metallic pipes 15$^b$ and 21 which convey a reheating fluid. Preferably, although not necessarily, the pipes 15$^b$ constitute the stationary blades of the turbine and which correspond to the stationary blades 15 of Figs. 5 and 6. The number of reheating tubes and their disposition and the temperature of the reheating fluid is such as to provide an isothermal or substantially an isothermal expansion within the blading. The turbine employed in accordance with this modification is basically like a conventional steam or mercury vapor reaction turbine, but with the addition of a reheating system comprising pipes and the special reheating tubes 15$^b$ and 21 within the blading which convey a superheated fluid, preferably a heavy fluid, having a high specific heat and high heat conductivity; this arrangement also requires the addition of a separate reheating plant $P^t$ (Fig. 7) for the separate reheating fluid. As suggested, the stationary blades 15$^b$ may be made hollow and themselves constitute the ducts for the reheating fluid.

Fig. 8 illustrates a fourth specific embodiment wherein continuous or quasi continuous reheating during expansion is obtained by providing the turbine blading with a chemically distinct reheating circuit carrying reheating fluids at a high temperature. The reheating may also be provided by two fluids in the process of combination. This realization of the invention may be used in steam turbines, mercury vapor turbines and in general in turbines using any vapor.

The principal expanding fluid, fuel and comburent undergo compression separately and pass through the heat exchanger. The fuel is optionally mixed with primary air in suitable mixers $X^3$ similar in design to carburetors. The fuel is then conducted to a series of small burners 17 inside of the separate secondary air circuit. This separate comburent circuit is defined by metallic pipes. Obviously the stationary blades 15$^d$ themselves may be hollow and thus define the desired air passages. The principal expanding fluid is reheated either alone by conductivity as it passes between the hot metallic blades or pipes 15$^d$ or by conductivity combined with mixing effect and radiation. The number of reheating tubes and burners and the heat released in each one is so designed as to insure a quasi isothermal flow inside the blading. The turbine employed is basically like a steam or mercury vapor reaction turbine but with passages shaped in accordance with the present invention, and with the addition of a reheating circuit system comprising pipes to convey fuel and optionally primary air, on the one hand, and comburent, on the other, and a set of metallic blades or pipes 15$^d$ properly shaped and which transmit the heat released by combustion or part of it to the expanding fluid flowing around them. This arrangement further comprises a set of small burners 17 located in the reheating tubes or an integrant part of them, and optionally a set of mixing devices $X^3$ to mix the fuel and the primary air, such mixing devices being in the nature of carburetors. The fluid expanded in the turbine may be air or other gaseous fluid, preferably a heavy gas, which is chemically inert, such as argon or a suitable vapor, such as ordinary steam, or preferably a heavier vapor. The use of vapor instead of a gas is very advantageous since it saves the work of compression. In the case where the fluid that does the expansion work is a more expensive fluid, the circuit is closed so that the same body of fluid remains in the circuit, being first expanded and then cooled and re-compressed or re-vaporized.

In the case of the realizations of the invention in which burners discharge into the passages, all the heat available from combustion or chemical combination is released at a constant temperature which can be very high and immediately transformed into mechanical energy in the form either of velocity energy communicated to the fluid, in the case of a stationary duct or nozzle, or either velocity energy and work on the bucket by reaction in the case of a rotating duct or bucket. The energy of chemical reaction is thus directly available in the form of mechanical work, that is, the "power of fire" (as used in Carnot's works) is thus completely converted into power for useful mechanical work.

If the work of compression can be avoided, for instance by using a vapor that is vaporized under pressure by heat, all the heat communicated to the working fluid at high temperature is transformed into mechanical energy available on the shaft of the power plant for use outside; the amount of heat necessary to vaporize the working vapor is not reproduced in the form of mechanical energy but remains in the form of heat that can, however, be optionally used in an outside heating system.

*Illustrative examples of the design of an isothermal nozzle in accordance with the present invention.*

As here employed, the term "nozzle" is to be understood as designating any passage, for example the passage defined by adjacent blades of a turbine stator, through which an expansible fluid flows while it expands isothermally.

Assume a fluid composed of a mixture of perfect gases having a gas constant $$R = 29.27 \frac{\text{kg. m.}}{1° \times \text{kg.}}$$

(the gas constant of air) is to be expanded isothermally in a stationary turbine duct or nozzle of circular cross-section.

Let the initial velocity at the entrance to the duct be 23.4 meters per second. The duct is to be 6.2 inches long, and the diameter of the circular entrance section is 0.4 inch. The fluid is to remain at a constant temperature of 900° K. (900° Kelvin or absolute; 627° C.). The total quantity of heat communicated to the flowing fluid between the entrance section of the duct and the outlet section is $$q = \frac{42.5 \text{ K cal.}}{\text{kg.}}$$

so that the corresponding compression ratio is $$\frac{P_0}{P} = 2.0$$

The effect of friction is neglected.

The distribution of the heat communicated to the fluid is as follows, as referred to lengths of duct beginning at the entrance section and terminating at the following distances from the entrance section:

| Distance | | |
|---|---|---|
| Distance=0.5″ | 3% | of the total heat |
| Distance=1.0″ | 33.8% | of the total heat |
| Distance=2.0″ | 56.4% | of the total heat |
| Distance=3.0″ | 68.8% | of the total heat |
| Distance=4.0″ | 77.8% | of the total heat |
| Distance=6.0″ | 98.2% | of the total heat |
| Distance=6.2″ | 100% | of the total heat |

The above figures indicate the heat released by a diffusion flame resulting from interdiffusion and combination of a central flow of methane gas of circular cross-section, which at the entrance to the duct is 0.2 inch in diameter and which forms the axial core of an annular stream of air, which at the entrance to the duct has an outside diameter of 0.4 inch.

Both streams of gas are at a temperature of 900° K. and have an entrance velocity of 23.4 meters per second. Both the methane and air are diluted with nitrogen to an overall dilution of 11.6%. The total heat of combination is thus $$\frac{85 \text{ K cal.}}{\text{kg.}}$$

the first one-half of which is released in the isothermal duct, and the second half after the gas leaves said duct. The above computations have been made in accordance with the above formula and from data given by Burke as it is found in a book entitled "Combustion, Flames and Explosion of Gases," by Lewis and Von Elbe, Cambridge University Press, Cambridge, 1938.

However, this distribution of heat may be determined experimentally.

Figure 3:
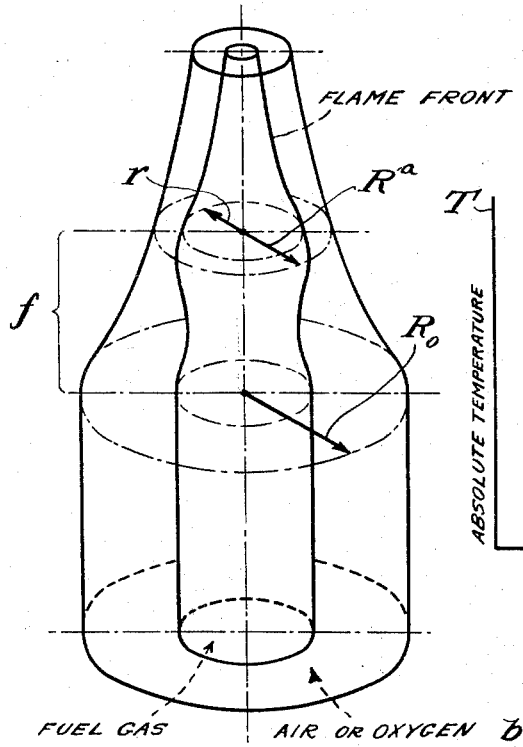
Fig. 3 is a diagram illustrative of the proper shape of cylindrical duct for isothermal flow.

The duct here chosen for consideration (Fig. 3) is of circular cross-section to correspond to a flame of that section. However, this is merely by way of example. The same kind of computation applies to the design of ducts of such other sections as might be desirable. The circular section is very useful as an example, and is particularly useful when a multiple burner is employed. Preferably, in such a compound burner, the individual orifices or jets are of circular section and located at the lattice joints of a centered hexagonal lattice. Thus, each individual burner jet is surrounded by a hexagonal space which is roughly approximate to an equivalent circular space tangent to the sides of the hexagon. Thus, each burner approximates a circular jet burner surrounded by an annular mantle.

In the following discussion, the following assumption is made, to wit, that all of the heat released by combustion at one cross-section is communicated to the fluid at a cross-section located at a constant distance of 0.125″ ahead of the cross-section at which the heat is released.

The computation of the successive sections of the duct may be made by the use of Formula 6 or by the use of combined Formulas 2a, 5a and 5.

For air $$R = 29.27 \frac{\text{kg. m.}}{1° \times \text{kg.}}$$

$$2gR = 574 \frac{\text{m}^2}{\text{sec.}^2 \times 1°}$$

$$AR = \frac{29.27 \frac{\text{kg. m.}}{1° \times \text{kg.}}}{427 \frac{\text{kg. m.}}{\text{K cal.}}} = 0.0686 \frac{\text{K cal.}}{1° \times \text{kg.}}$$

For $$T = 900° \text{ K.}$$

$$ART = 61.75 \frac{\text{K cal.}}{\text{kg.} \times 1°}$$

$$2gRT = 516600 \frac{\text{m}^2}{\text{sec.}^2}$$

The value $$\Delta q = 85 \frac{\text{K cal}}{\text{kg.}}$$

chosen for the total quantity of heat released by the methane gas diffusion flame, as a basis for the data of the example given, corresponds to a compression ratio $$\pi = \frac{p_0}{p} = 4$$

and the value $$\frac{\Delta q}{2} = 42.5 \frac{\text{K cal}}{\text{kg.}}$$

corresponds to a compression ratio $$\pi^1 = \frac{p_0}{p} = 2$$

As the burned gases, in the example given, are discharged into the atmosphere, the pressure of the gas at the entrance to the stationary ducts of the turbine is 4.0 atmospheres, and the pressure at the duct outlet is 2.0 atmospheres. A further drop from 2.0 atmospheres to 1.0 atmosphere takes place in the subsequent stages of the turbine which may, as here illustrated, have but two wheels. The fluid expands initially in the first set of stationary circular ducts; after this the fluid communicates its velocity energy to the blades of the first wheel. More velocity energy is released from continued combustion during this stage and some drop in pressure occurs. As a rough approximation, one may neglect this latter release of energy and shape the blades like those of an impulse turbine; a more careful approximation requires that the blades be shaped as though it were a reaction turbine.

After leaving the first wheel, the burning gases expand from a pressure of about 2.0 atmospheres to a pressure slightly above 1.0 atmosphere in a second stage, in passing through a stationary duct or nozzle. The shape of this latter duct or nozzle is such that the expansion-combination process is isothermal, the method of computing the shapes of the passages being the same as that above described.

In passing through the second stationary duct or nozzle, the velocity of the fluid is greatly increased, and the velocity energy is then imparted to the second wheel. A slight drop in pressure takes place in the latter wheel. Optionally, more kinetic energy may be released during passage through this second wheel. For a rough approximation, the blades of the second wheel may be designed like an ordinary impulse turbine.

When leaving the last wheel of the series, the fluid is slightly above atmospheric pressure. The exhaust fluid is led through the heat exchanger and communicates its heat to the entering compressed fluid, and is finally discharged to the atmosphere.

The first stationary nozzle is here designed in accordance with the following method of computation, completely equivalent to the direct use of Formula 5a.

Neglecting friction, a heat input of $$\Delta q = 42.5 \ \frac{K \ cal.}{kg.}$$

corresponds to a release of kinetic energy $$\Delta E = \frac{C^2}{2g} - \frac{C_0^2}{2g} = 427 \ \frac{kg. \ m.}{K \ cal.} \times 42.5 \ \frac{K \ cal.}{kg.} = 18150 \ \frac{kg. \ m.}{kg.}$$

$$\Delta C^2 = C^2 - C_0^2 = 2 \times 9.81 \ \frac{m.}{sec.^2} \times 18150 \ \frac{kg. \ m.}{kg.} = 356100 \ \frac{m.^2}{sec.^2}$$

$$C^2 = 356100 \ \frac{m.^2}{sec.^2} + 500 \ \frac{m.^2}{sec.^2} = 356650 \ \frac{m.^2}{sec.^2}$$

$$C = 597 \ \frac{m.}{sec.}$$

Let $D$ = the diameter of the running section of the duct at any given point, and let $$\gamma = \sqrt{\frac{S_0}{S}} = \frac{D_0}{D}$$

The following table gives the values of $\Delta C^2$; $C$;

$$\pi = \frac{p_0}{p}; \quad y = \frac{S_0}{S} = \frac{C}{C_0} \frac{1}{\pi}$$

and $\gamma$ for sections of the duct at a series of points measured in inches from its entrance end.

| Inches | $q$ in percent | $\Delta C^2$ m.$^2$/sec.$^2$ | $C^2$ m.$^2$/sec.$^2$ = $C_0^2 + \Delta C^2$ | $C$ m./sec. | $\log \pi = \frac{q}{ART}$ | $\pi$ | $Y = \frac{S_0}{S}$ | $\gamma = \frac{D_0}{D}$ | $D = \frac{0.4''}{\gamma}$ |
|---|---|---|---|---|---|---|---|---|---|
| 0 | 0 | 0 | 550 | 23.4 | 0 | 1 | 1 | 1 | 0.40 |
| 0.5 | 3 | 10,700 | 11,250 | 106.0 | 0.021 | 1.02 | 4.42 | 2.10 | 0.19 |
| 1.0 | 32.8 | 117,000 | 117,550 | 343.0 | 0.227 | 1.25 | 12.20 | 3.49 | 0.118 |
| 2.0 | 56.4 | 197,050 | 198,050 | 445.0 | 0.390 | 1.48 | 12.85 | 3.58 | 0.112 |
| 3.0 | 68.8 | 245,800 | 246,350 | 496.0 | 0.476 | 1.61 | 13.10 | 3.62 | 0.1105 |
| 4.0 | 77.8 | 278,000 | 278,550 | 528.0 | 0.538 | 1.71 | 13.20 | 3.635 | 0.1100 |
| 6.0 | 98.2 | 350,000 | 350,550 | 592.0 | 0.680 | 1.95 | 13.00 | 3.605 | 0.1110 |
| 6.2 | 100.0 | 356,100 | 356,650 | 597.0 | 0.693 | 2.0 | 12.80 | 3.58 | 0.1118 |

The above conditions for communicated heat distribution can be obtained by providing the nozzle with one hundred diffusion flames arranged equidistantly from one another, as above described. This can be accomplished by arranging at the entrance to the fixed duct or nozzle a burner consisting of 100 cylindrical jet tubes each of 0.2'' in diameter with their centers disposed at the lattice joints of a central hexagonal lattice.

In another example, in all respect similar to the above one, the heat supplied to the working fluid during isothermal expansion is produced by four sets of 400 diffusion flames, each, burning inside of the working fluid. The great bulk of this working fluid is nitrogen. The burning gases that supply the heat are methane ($CH_4$) and oxygen ($O_2$) diluted in the bulk of nitrogen; both methane and oxygen constitute a minor part of the working fluid, together with the products of combustion which are carbon dioxide ($CO_2$) and water vapor ($H_2O$).

In the computations which follow, the working fluid is treated as having all of the characteristics of ordinary air, so far as its thermodynamic properties are concerned, and this is usually a satisfactory assumption.

Figs. 14 and 15 diagrammatically illustrate a turbine embodying the present invention. As illustrated, the turbine comprises a shaft 40 which may, for example, be coupled directly to the shaft of an electric generator. The shaft 40 carries the rotors of two wheels 41 and 42, each rotor being arranged within a stator housing, and each rotor having blades which cooperate with the fixed nozzles of the stator. Four "first" nozzles 43, 44, 45 and 46 are arranged to deliver the expanding fluid, for example, a combustible gas, to the first wheel 41, the nozzles 43, 44, etc. being arranged 90° apart. Exhaust from the first wheel is delivered to the second wheel 42 by "second" nozzles 47 which may be similar to the nozzles 43, 44, etc. The exhaust from the turbine 42 is delivered by a duct 48 to a heat-exchanger 49. The conduits 51 and 50 conduct combustible fuel gas and air in heat-exchanging relation to the exhaust flowing through the heat-exchanger chamber, and the preheated fuel gas and air are then delivered to the nozzles 43, 44, etc. For specific example, methane gas, diluted with nitrogen, with a dilution ratio of 0.0466 (that is, a mixture of 4.66% by volume of methane and 95.34% by volume of nitrogen), flows out of a compressor at a pressure of 4.0 atmospheres and at a temperature of 27° C. or 300° K. This gas is conducted through the heat exchanger 49 wherein the temperature of the gas is increased to 627° C. or 900° K. while its pressure remains substantially constant at 4.0 atmospheres. From the heat exchanger (whose detailed construction forms no part of the invention) the diluted methane gas passes through four cylindrical conduits 51, each of 2.0" internal diameter, and at a velocity of 23.4 meters per second. Each of these conduits 51 are arranged inside of a 4.0" diameter pipe 50 through which flows diluted air. The methane-carrying conduits lead to a distributor 53. This distributor divides the diluted methane and delivers it in substantially equal quantities into 400 pipes of circular cross-section and of 0.1" diameter. Preferably the cross-section and arrangement of these 0.1" diameter pipes is such as to produce a compact hexagonal network. The velocity of the diluted methane gas in passing through the 0.1" diameter pipes remains at substantially 23.4 meters per second. A mixture composed of 3.1% of oxygen and 96.9% of nitrogen can be obtained by diluting air in nitrogen, the dilution being 0.155. This dilution of oxygen is calculated to produce a stoichiometric ratio between methane and oxygen according to the following formula:

$$CH_4 + 2O_2 \rightarrow CO_2 + 2H_2O + 210.0 \text{ Cal.}$$

The total discharge of the diluted methane plus diluted air in the four sets of 400 streams is 0.764m.³/sec. These streams of diluted methane start burning in the air in the first isothermal nozzles 43, 44, 45 and 46. Combustion continues through the first wheel 41 and in the second isothermal nozzles 47. Combustion is complete at the end of the second nozzles 47 so that the second rotor is purely an impulse wheel.

The proper form for the first nozzles, so that the flow of burning gases may be isothermal, is obtainable as herein described. By properly dimensioning the device, the temperature will remain at 900° K. throughout the first nozzle. In the example now under discussion, the first rotor of the turbine is of an axial width sufficiently small, as compared with the stationary nozzles, so that the effect of reaction due to combustion inside of the rotor 41 may be neglected. The rotor is an impulse wheel rotating in a space at a uniform pressure of 2.0 atmospheres. The blading of the rotor is shaped as in an ordinary impulse turbine, so as to provide for maximum efficiency and continuous flow. In another example, a method is disclosed whereby the proper form may be given to the buckets of a wheel, inside of which the effect of communicated heat can not be neglected. The method of giving the approximate form to the second stationary nozzle is exactly the same as that disclosed at the first stationary nozzle. The method of giving the proper shape to the blades of the second wheel so that the efficiency of this wheel may be a maximum is the usual method of design used for purely impulse turbine wheels.

During the operation, the pressure drops from 4.0 atmospheres to 2.0 atmospheres in the first stationary nozzle, and the velocity increases from 23.4 meters per second to 597 meters per second. In the first wheel the pressure drop is negligible. Neglecting friction and shaping the blading of this wheel for an absolute outlet velocity of 23.4 meters per second (the same as the velocity at the entrance of this stage), the first wheel converts the velocity energy released in the stationary nozzle into mechanical work on the shaft. The velocity energy head is $$\frac{(597 \text{ m./sec.})^2 - (23.4 \text{ m./sec.})^2}{2 \times 9.81 \text{ m./sec.}^2} = 18150 \text{ m.}$$

The total discharge is 0.764m.³/sec. in volume or 1.20kg./sec. of equivalent air. The power available on the shaft is 18150 m.×1.20 kg./sec.=21800 m. kg./sec.=290 H. P.=216 kilowatts.

In the second stationary nozzle, the pressure drops from 2.0 atmospheres to 1.0 atmosphere and the velocity increases from 23.4 meters per second to 597 meters per second due to a heat input of 42.5 k calories from the second part of the combustion of the methane—the temperature of 900° K. remaining constant.

The second wheel rotates in a space which is at atmospheric pressure. The fluid leaves the wheel with an absolute velocity of 23.4 meters per second (the same as the entrance velocity for the inlet of this second stage). The speed of the wheel is 14,000 revolutions per minute and the tangential velocity at the pitch circle of the wheel is 300 meters per second. Neglecting friction, this second wheel, converts the velocity energy released in the second stationary nozzle into mechanical work on the shaft which thus receives a power of $$\frac{(597 \text{ m./sec.})^2 - (23.4 \text{ m./sec.})^2}{2 \times 9.81 \text{ m./sec.}} \times$$

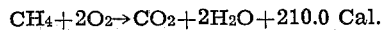

1.20 kg./sec.=290 H. P.=216 kilowatts

The energy thus released at the second stage is equal to the energy released in the first stage of the turbine; thus, the total power of the turbine is 290 H. P. plus 290 H. P., equals 580 H. P., equals 432 kilowatts. The heat input is 85 K cal./kg.×1.20 kg./sec.=102 K cal./sec.

The consumption of methane gas is 0.191 m.³/sec.×0.0466=0.0089 m.³=8.91/sec. (at 900° K. and 4.0 atmosphere)

or 10.75l/sec. (at 0° and 1 atmosphere)

or 7.75 gr./sec.=28 kg./hour

Certain differences between the construction hereinabove referred to and that of existing gas turbine power plants may be noted. Thus, in the existing power plants, the combustion of fuel takes place in an outside combustion chamber at about constant pressure, whereas, in accordance with the present invention, the combustion takes place throughout the nozzles and buckets of the turbine itself, with a great drop in pressure between the point where combustion starts and ends. In existing power plants the temperature rises considerably in the combustion chamber, whereas in the present turbine the temperature remains constant all through the combustion nozzles and buckets of the turbine wheels—thus, the expansion of the fluid is isothermal.

The following example relates to that situation where the heat communicated to the fluid, while passing through the blades of the turbine wheel, is not negligible in comparison with the velocity head of the stream approaching the wheel.

Assume a wheel having a pitch circle diameter of 16" or 40.7 cm.; a rotational velocity of 14,000 R. P. M. (that is, a tangential velocity at the pitch circle of 300 m./sec). Also assume that the angle of approach of the stationary nozzle is 18° 26′ and that the axial width of the wheel blades is 1.5″. It is also assumed that the distribution of the communicated heat within the rotating bucket is as follows:

The total heat communicated to the fluid between the entrance and delivery sections is 4.25 K cal. per kg. of fluid passing through the duct; 20% of this amount is communicated after the fluid has traveled 25% of the distance across the wheel, parallel to the axis of rotation; 40% is communicated while the fluid is traversing the second half of its path; and 70% is communicated after the fluid has traveled three-quarters of its path.

Hereafter there is disclosed a method of computing the proper area and shape to be given to the cross-section of the moving bucket so that the flow may be isothermal through the bucket.

Having determined the angle of approach of the delivery nozzle; the absolute velocity $C_0$ of the fluid at the entrance (597 m./sec.); and the tangential linear velocity $\mu$ (300 m./sec.) of the wheel, the velocity diagram may be drawn, from which may be determined the relative entrance velocity $\gamma_0$ in magnitude and position $\gamma_0 = 330$ m./sec. From this point, the computation of the areas of the duct at any selected section is exactly the same as the computation for a stationary duct.

Upon the assumption that the fluid entering the bucket is hot compressed air at 900° K. and at 4.0 atmospheres—neglecting friction—a heat input of $$4.25 \frac{K\ cal.}{kg.}$$

corresponds to a release of kinetic energy according to the formula $$\Delta E = \frac{\gamma^2}{2g} - \frac{\gamma_0^2}{2g} = 427 \frac{kg.\ m.}{K\ cal.} \times 4.25 \frac{K\ cal.}{kg.} = 1815 \frac{kg.\ m.}{kg.}$$

$$\Delta \gamma^2 = \gamma^2 - \gamma_0^2 = 2(9.81\ m./sec.^2) \times \left(1815 \frac{kg.\ m.}{kg.}\right) = 35,605\ m.^2/sec.^2$$

The values of $$\Delta\gamma^2;\ \gamma;\ \pi = \frac{p_0}{p};\ B = \frac{Z_0}{Z};\ T = \frac{W_0}{W}$$

(where $W$=the width of the bucket, axially of the wheel) are for sections located at points which are 0%; 25%; 50%; 75% and 100% of the path from the entrance section.

This angle $\alpha$ at the outlet must be related to the angle $\alpha_0$ at the inlet as expressed by the equation $$\frac{W}{\sin \alpha} = \frac{W_0}{\sin \alpha_0}$$

Thus, $\sin \alpha = 0.345$ and $\alpha = 20°\ 10'$.

Having ascertained the above value, there is thus drawn a curve Fig. 18 indicating the central path tangent at the entrance section (0%) to the rotation velocity $a_0$ (inclined at 37°) and tangent at the outlet section (100%) to the relative velocity $a_4$ (inclined at 20° 10′). The intermediate curve of the path of the fluid may be chosen to comply with other requirements, such as maximum efficiency. At each of the points (0%, 25%, etc.) a normal to the central path curve is drawn, and on each side of the curve one-half of the corresponding computed value for $W$ (width of the duct) is laid off on the normal. Thus, five sections of the duct are exactly determined and from this data the walls of the entire duct may be designed. Having chosen a width of 1.0″ for the entrance, the distance between the edges of adjacent blades must be $$\frac{1.0}{\sin \alpha_0} = 1.75''$$

Thus, the position of the edges of the blade are completely determined and the shape of the blade can be obtained. The blades are thus located at intervals of 1.75″ about the pitch circle of the wheel.

In the foregoing example, the height $h$ of the bucket is a variable, the variation being linear across the wheel and such that $$\frac{h}{h_0} = 1.6$$

In the above example where the heat supplied to the working fluid during isothermal expansion is produced by four sets of four hundred diffusion flames burning inside of the working fluid, the great bulk of the working fluid is nitrogen. The burning gases which supply the heat are methane ($CH_4$) and oxygen ($O_2$) diluted in the mass of nitrogen, the methane and oxygen also constitute a minor part of the working fluid, together with the products of combustion which are carbon dioxide ($CO_2$) and water vapor ($H_2O$).

In cases where the quantity of heat communicated to the flowing fluid can not, within a permissible approximation, be regarded as uniformly communicated to all points in a given cross-section of the flowing stream, the following method may be used:

Divide the stream into a number of fillets to each of which heat is communicated uniformly

| Percent of path | $\Delta_x$ in percent | $\Delta\gamma^2$ m.²/sec.² | $\gamma^2$ m.²/sec.² | $\gamma$ m./sec. | log $\pi$ | $\pi$ | $B = \frac{Z_0}{Z}$ $\frac{C}{C_0} \cdot \frac{1}{\pi}$ | $h$ (Height of bucket) | $\frac{h}{h_0}$ | $\frac{W_0}{W}$ | $W$ inches | $W$ (mm.) |
|---|---|---|---|---|---|---|---|---|---|---|---|---|
| 0 | 0 | 0 | 109,500 | 330 | 0 | 1 | 1 | 2 | 1.0 | 1 | 1 | 25.4 |
| 25 | 20 | 7,121 | 116,621 | 340 | 0.0139 | 1.016 | 1.012 | 2.3 | 1.15 | 1.161 | 0.86 | 21.8 |
| 50 | 40 | 14,242 | 123,742 | 351 | 0.0277 | 1.029 | 1.030 | 2.6 | 1.3 | 1.34 | 0.746 | 19.0 |
| 75 | 70 | 25,002 | 134,502 | 366 | 0.0484 | 1.050 | 1.055 | 2.9 | 1.45 | 1.53 | 0.655 | 16.6 |
| 100 | 100 | 35,605 | 145,105 | 382 | 0.0683 | 1.072 | 1.080 | 3.2 | 1.60 | 1.73 | 0.580 | 14.6 |

One condition of proper design is that the distance between the discharge edges of the blades $Bm$ and $Bn$ (Fig. 18) be the same as the distance between the discharge edge of the blades. This distance is represented by the equation $$d = \frac{W}{\sin} \alpha$$

through the cross-section. In order that the heat exchange may be isothermal, each individual fillet must have a cross-sectional area according to the formula $$\frac{S}{S_0} = e^{\frac{q + A\int x}{ART}} \frac{C_0}{\sqrt{C_0^2 + \frac{2g}{A}q}} \qquad (7)$$

The area of the running cross-section of the duct enclosing all of the individual fillets composing the stream is obtained by summing up the individual areas.

The present invention is not necessarily limited to cases where the working gas can be treated as a substantially perfect gas obeying the law $$pv = RT$$

For gases which do not follow the law of perfect gases, an approximation in the design of the turbine passages may be made by the use of Van der Waal's formula, that is to say, $$\left(p + \frac{a}{v^2}\right)(v-b) = RT$$

In this formula the values $p$ and $v$ of the perfect gas are replaced by $$p + \frac{a}{v^2}$$

and $(v-b)$, respectively.

When herein reference is made to a "gas turbine" it is to be understood that this term is used in the broad sense to mean any turbine or equivalent apparatus working with any gaseous fluid whether simple or compound and whether a pure gas, a mixture of pure gases, a vapor or a mixture of a gas and vapor.

I claim:

1. A prime mover comprising a rotor having a series of peripheral blades defining fluid passages, and means defining a duct through which a burning gaseous medium flows toward said fluid passages, said duct being shaped and dimensioned in accordance with the formula $$\frac{S}{S_0} = \left(e^{\frac{q+A\xi x}{ART}}\right)\left(\frac{C_0}{\sqrt{C_0^2 + \frac{2g}{A}q}}\right)$$

where $g$ is the acceleration due to gravity,
$C_0$ is the mean velocity at the entrance to the duct,
$R$ is the gas constant,
$T$ is the absolute temperature of the gas at the chosen section,
$e$ is the base of the system of Napierian logarithms,
$x$ is the abscissa of the chosen section measured along the axis of the duct,
$\xi x$ is the quantity of energy transformed into heat by friction loss,
$q$ is the quantity of heat communicated to the flowing gas from entrance section to chosen section,
$A$ is the caloric equivalent of work,
$S_0$ is the area of the entrance to the duct, and
$S$ is the area of the chosen section, whereby to insure isothermal expansion of the burning gaseous medium, with concomitant increase in velocity, as it approaches the passages between the rotor blades.

2. A prime mover according to claim 1, further characterized in having a stator, provided with spaced blades, coaxial with the rotor, the spaces between the blades of the stator collectively defining the duct in which isothermal expansion of the burning gaseous medium takes place.

3. A prime mover according to claim 1, further characterized in having a stator provided with spaced blades, coaxial with the rotor, and in having burners interposed between the blades of the stator through which burning gaseous medium is delivered into the spaces between the stator blades said spaces collectively constituting the duct wherein isothermal expansion takes place.

4. A prime mover according to claim 1, further characterized in having a stator provided with spaced blades, coaxial with the rotor, the spaces between the stator blades collectively constituting the duct in which isothermal expansion takes place, and heat-exchanger means constructed and arranged to utilize the heat of the fluid medium escaping from the rotor for preheating the gaseous medium on its way to said duct.

5. A prime mover according to claim 1, further characterized in having a stator provided with spaced blades, coaxial with the rotor, the spaces between the stator blades collectively constituting the duct in which isothermal expansion takes place, the blades of the stator being hollow, and means for introducing a heating medium into the hollow blades thereby to add heat energy to the gaseous medium flowing through the duct.

6. A prime mover according to claim 1, further characterized in having a stator provided with spaced blades coaxial with the rotor, the spaces between the stator blades collectively constituting the duct in which isothermal expansion takes place, the blades of the stator being hollow, and having burner orifices from which flames issue for adding heating energy to gaseous medium flowing through the duct.

7. A prime mover according to claim 1, further characterized in having a stator provided with spaced blades, coaxial with the rotor, the spaces between the stator blades collectively constituting the duct in which isothermal expansion takes place, thin walled, hollow pipes extending through spaces between the stator blades, and means for delivering a heating medium into said hollow pipes thereby to add heat energy to the gaseous medium flowing through the duct.

8. A prime mover according to claim 1, further characterized in having a stator provided with spaced blades coaxial with the rotor, the spaces between the stator blades collectively constituting the duct in which isothermal expansion takes place, thin-walled, hollow pipes extending through spaces between the stator blades, and means for heating and circulating a heating medium through said pipes thereby to add heat evenly to the gaseous medium flowing through the duct.

9. A prime mover comprising a rotor having a series of peripheral blades defining fluid passages, a stator coaxial with the rotor, the stator also having blades defining fluid passages, means defining a duct for delivering a combustible gaseous medium into the passages between the stator blades, the blades of the stator and the rotor being shaped and dimensioned in accordance with the formula $$\frac{S}{S_0} = \left(e^{\frac{q+A\xi x}{ART}}\right)\left(\frac{C_0}{\sqrt{C_0^2 + \frac{2g}{A}q}}\right)$$

where $g$ is the acceleration due to gravity,
$C_0$ is the mean velocity at the entrance to the duct,
$R$ is the gas constant,
$e$ is the base of the system of Napierian logarithms, T is the absolute temperature of the gas at the chosen section,
$x$ is the abscissa of the chosen section measured along the axis of the duct,
$\int x$ is the quantity of energy transformed into heat by friction loss,
$q$ is the quantity of heat communicated to the flowing gas from entrance section to chosen section,
A is the caloric equivalent of work,
$S_0$ is the area of the entrance to the duct, and
S is the area of the chosen section, whereby to insure isothermal expansion of the gaseous medium as it flows through the passages in the stator and rotor.

10. A prime mover comprising a rotor having a series of peripheral blades defining fluid passages, means defining stationary ducts from which an expansible fluid is delivered into said passages, said ducts being shaped and dimensioned in accordance with the formula $$\frac{S}{S_0}=\left(e^{\frac{q+A\int x}{ART}}\right)\left(\frac{C_0}{\sqrt{C_0^2+\frac{2g}{A}q}}\right)$$

where $g$ is the acceleration due to gravity,
$C_0$ is the mean velocity at the entrance to the duct,
R is the gas constant,
T is the absolute temperature of the gas at the chosen section,
$e$ is the base of the system of Napierian logarithms,
$x$ is the abscissa of the chosen section measured along the axis of the duct,
$\int x$ is the quantity of energy transformed into heat by friction loss,
$q$ is the quantity of heat communicated to the flowing gas from entrance section to chosen section,
A is the caloric equivalent of work,
$S_0$ is the area of the entrance to the duct, and
S is the area of the chosen section, whereby to insure isothermal expansion of a burning gaseous medium flowing through said passages, and means for adding heating energy to the gaseous medium as it flows through said passages.

11. In combination, in apparatus for use in the generation of power, means defining a duct through which a burning gaseous medium flows toward a point of discharge, said duct being internally shaped and dimensioned in accordance with the formula $$\frac{S}{S_0}=\left(e^{\frac{q+A\int x}{ART}}\right)\left(\frac{C_0}{\sqrt{C_0^2+\frac{2g}{A}q}}\right)$$

where $g$ is the acceleration due to gravity,
$C_0$ is the mean velocity at the entrance to the nozzle,
R is the gas constant,
T is the absolute temperature of the gas at the chosen section,
$e$ is the base of the system of Napierian logarithms,
$x$ is the abscissa of the chosen section measured along the axis of the duct,
$\int x$ is the quantity of energy transformed into heat by friction loss,
$q$ is the quantity of heat communicated to the flowing gas from entrance section to chosen section,
A is the caloric equivalent of work,
$S_0$ is the area of the entrance to the duct, and
S is the area of the chosen section, whereby to insure isothermal expansion of the burning gaseous medium passing through said duct, with concomitant increase in velocity, as it approaches the discharge point.

HENRY M. PUTMAN, JR.

References Cited in the file of this patent

UNITED STATES PATENTS

| Number | Name | Date |
|---|---|---|
| 745,270 | Wilkinson | Nov. 24, 1903 |
| 864,315 | Lentz | Aug. 27, 1907 |
| 910,237 | Schmick | Jan. 19, 1909 |
| 2,225,311 | Lysholm | Dec. 17, 1940 |
| 2,242,767 | Traupel | May 20, 1941 |
| 2,243,467 | Jendrassik | May 27, 1941 |
| 2,377,611 | Caldwell | June 5, 1945 |
| 2,394,124 | Warren | Feb. 5, 1946 |
| 2,407,166 | Kreitner et al. | Sept. 3, 1946 |
| 2,468,461 | Price | Apr. 26, 1949 |

FOREIGN PATENTS

| Number | Country | Date |
|---|---|---|
| 232,681 | Germany | Mar. 18, 1911 |
| 339,590 | Germany | July 29, 1921 |
| 357,797 | Germany | Sept. 1, 1922 |